March 23, 1965   R. B. WALLACE ETAL   3,174,190
METHOD OF FORMING A RECESS IN THE THREAD
PORTION OF A FASTENER
Original Filed March 17, 1958

INVENTORS
RICHARD B. WALLACE
ROBERT J. EBBERT
BY
ATTORNEYS

United States Patent Office 3,174,190
Patented Mar. 23, 1965

3,174,190
METHOD OF FORMING A RECESS IN THE THREAD PORTION OF A FASTENER
Richard B. Wallace, Bloomfield Hills, and Robert J. Ebbert, Rochester, Mich., assignors to The Oakland Corporation, Birmingham, Mich., a corporation of Michigan
Original application Mar. 17, 1958, Ser. No. 722,027, now Patent No. 3,020,570, dated Feb. 13, 1962. Divided and this application Dec. 5, 1960, Ser. No. 73,575
3 Claims. (Cl. 10—10)

The present invention relates to a method and apparatus for making self-sealing, self-locking threaded fasteners.

The present application is a division of our copending application, Serial No. 722,027, filed March 17, 1958, now Patent 3,020,570.

More specifically, the present invention relates to the production of self-sealing, self-locking threaded fasteners in which a plastic plug is permanently secured in a recess provided in a threaded part to extend outwardly therefrom to lock and seal with a cooperating threaded member.

It is an object of the present invention to provide a method and apparatus for producing such a device by an operation which includes recessing the member by the application of pressure through a recessing tool to cause a displacement or flow of metal.

More specifically, it is an object of the present invention to provide a method and apparatus as described in the preceding paragraph in which the recessing operation is accompanied by an operation including the support of the area immediately surrounding the recess by a thread conforming surface so as to eliminate or control substantial thread distortion occasioned by the recessing operation.

It is a further object of the present invention to provide a method and apparatus in which the recessing operation follows a threading operation, and in which during the recessing operation the threaded member is firmly supported in a thread conforming support or die to prevent or control local distortion of the threads adjacent the recess.

It is a further object of the present invention to provide a method and apparatus in which a threaded element is provided with a portion of reduced threads, and in which the reduced threaded portion is supported in a die having threads dimensioned to fit with standard or unreduced threads on the threaded element, and in which a recess is provided in the reduced threaded portion by the application of pressure to cause a displacement or flow of metal which is accommodated in the space intermediate the threads of the reduced threaded portion and the standard or normal sized threads of the die.

Other objects and features of the invention will become apparent as the description proceeds, especially when taken in conjunction with the accompanying drawings, illustrating a preferred embodiment of the invention, wherein.

Figure 1:
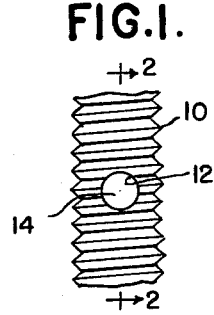
FIGURE 1 is a fragmentary side elevation of a threaded fastener having a plastic plug received in a recess therein.
Figure 2:
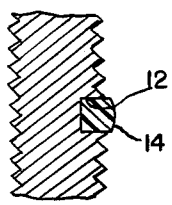
FIGURE 2 is a fragmentary sectional view on the line 2—2, FIGURE 1.

Referring first to FIGURES 1 and 2 there is shown a threaded fastening element 10 in the form of a screw or bolt having a radially extending recess 12 in a side thereof in which is received a cylindrical plug 14 of a suitable plastic material. Excellent results are obtained when the threaded plug is formed of nylon. The plug 14 is inserted under pressure so that a portion thereof which projects outwardly beyond the confines of the recess 12 is somewhat mushroomed to provide a protuberance which extends laterally somewhat beyond the sides of the recess.

When the screw or bolt is received in a nut or threaded recess protruding plastic material is caused to flow and fill and seal the space between the threads of the threaded elements. This effectively prevents leakage which might otherwise occur in the helical path of the engaged threads.

The most important function however of the plug is to provide a frictional interlock which retains the threaded element in assembled relation.

In the past, the recess has been provided in the threaded fastener usually by a drilling operation in which metal is removed. In accordance with the present invention the recess 12 is provided in the previously threaded part by the application of pressure so that the metal which is displaced from the recess or opening is caused to flow into adjacent areas.

Since the operation is carried out on a previously threaded part, unless special precautions are taken, this lateral flow of displaced metal will result in unacceptable thread distortion.

In accordance with the present invention, the recess is provided in an operation in which pressure is applied to the previously threaded fastener in a radially inward direction while the flow of metal displaced from the recess is controlled or guided so as to avoid unacceptable thread distortion.

Figure 3:
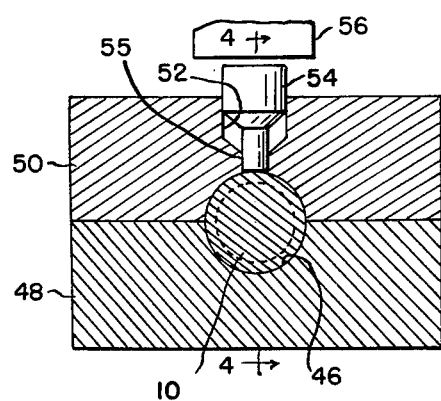
FIGURE 3 is a sectional view through a two-part threaded die block for supporting a threaded part for recessing, showing the recessing tool in retracted position.
Figure 4:
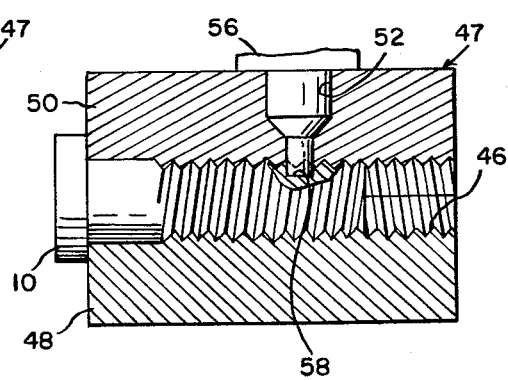
FIGURE 4 is a sectional view on the line 4—4, FIGURE 3, but showing the recessing tool in the recessing position.

Referring now to FIGURES 3 and 4 the previously threaded part 10 is placed within the cavity 46 in a two-part die indicated generally at 47 composed of a lower member 48 and an upper member 50. The cavity 46 is formed by generally semi-cylindrical recesses in the two die members, and as best illustrated in FIGURE 4, the cavity 46 is provided with a thread formation designed to conform closely to the thread on the fastener 10.

The upper die is provided with an opening 52 for the reception of a recessing tool 54 the lower portion of which is reduced and may be of suitable cross-section, such as circular, square, or the like.

The reduced portion 55 of the recessing tool is shaped to fit very closely within the lower portion of the opening 52 so as to avoid the counter-flow of metal into the space between the portion 55 of the tool and the opening 52. Accordingly, as the metal is displaced, its flow is controlled and guided into tooth form, the surfaces of the recess 58 and the threads on the fastener being in engagement with the corresponding surfaces of the recessing tool and the die when the operation is complete. Accordingly, there is no possibility of the formation of burrs or the like, nor is there any formation of chips or shavings. The threaded fastener is accordingly ready for the next succeeding operation; namely, the insertion of the plastic plug, without any intervening secondary operation.

Associated with the structure so far described is a movable actuating member 56 which may be part of a press in which the die is received. In FIGURE 4 the member 56 is shown in lowered position having forced the recessing tool 54 inwardly to form a recess 58 in the fastener 10.

Inasmuch as the threaded portion of the fastener is tightly embraced by the thread conforming surfaces of the die 47, distortion of the previously formed threads in the area surrounding the recess 58 is substantially prevented. Obviously of course, the metal displaced to form the recess 58 has to flow somewhere and the flow is permitted by a small clearance between the threaded form of the die and the fastener. Thus, the displaced metal is caused to flow in a controlled manner or is guided into the spaces between threads of the die in the zone surrounding the recess.

It will of course be apparent that it is essential to provide the close thread conforming surfaces primarily in the zone surrounding the recess 58, and if desired the balance of the threaded fastener may be otherwise supported. However, it is convenient to provide the die recess 46 shaped to conform to the threaded surface of the fastener throughout the entire threaded portion thereof.

While it was indicated that the conforming thread surfaces of the die prevent unacceptable thread distortion, it is possible to reduce thread distortion still further, or to completely eliminate it if a particularly accurate final thread conformation is required.

Figure 5:
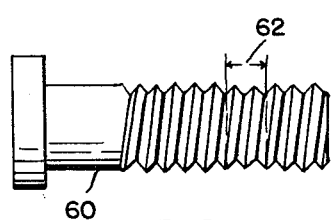
FIG. 5 is an elevational view of a threaded fastener having a reduced portion for recessing in the apparatus illustrated in FIGURES 3 and 4.

In FIGURE 5 there is illustrated a fastener 60 which is to be provided with a recess in the zone indicated at 62. Within this zone the threads during their initial formation are relieved or of reduced diameter, preferably both at crest and root diameters, to permit some radial growth when the material is displaced to form the recess therein. While this relief of the tooth form of course is needed only in the area closely adjacent to the recess, it is most convenient to provide it in a complete annular zone at a specific axial position so that when the threaded fastener is inserted in a die such as the die 47, it may be inserted to a position determined by engagement of its head portion with a suitable locating surface and without reference to the angular location of the fastener in the die. This will result in threads within the zone 62 which may be relatively low or in clearance relation with a cooperating threaded part at points circumferentially separated from the recess, but it will permit a very close tolerance between the remaining threads which might otherwise result in jamming.

The operation described above may be carried out with very considerable rapidity and has certain definite advantages over the previously known process in which the recesses were provided by drilling. In the first place, since no metal is removed there are no chips or shavings. Secondly, the operation eliminates the presence of any burrs at the edge of the opening since the surfaces thereat are confined by the reduced portion of the plunger and the cooperating die surfaces. Accordingly, no second operation is required to remove chips, shavings or burrs.

Another important advantage is that if desired the recess provided by the die and press need not be of circular cross-section. In some cases for example, it may be desirable to provide a plug which extends across a maximum number of threads, in which case the plug may be substantially elongated in cross-section in the direction of the axis of the screw or bolt.

The drawings and the foregoing specification constitute a description of the improved method and apparatus for making self-sealing, self-locking threaded fasteners in such full, clear, concise and exact terms as to enable any person skilled in the art to practice the invention, the scope of which is indicated by the appended claims.

What we claim as our invention is:

1. The method of forming a recess in a threaded fastener having threads of standard height througout its threaded length, which comprises providing threads of reduced height in a predetermined zone on the threaded fastener so as to have more than normal clearance with respect to a cooperating uniformly threaded member, applying pressure radially inwardly to a predetermined area of the fastener within said zone, thereby displacing material by the application of pressure which flows outwardly in the zone surrounding the application of pressure, and limiting the outward flow of displaced material to produce thread portions of standard height in the zone surrounding the recess formed by the application of pressure.

2. The method of forming a recess in a threaded fastener having threads of standard height throughout its threaded length, which comprises providing threads of reduced height both at the crests and roots thereof in a predetermined zone on the threaded fastener, applying pressure radially inwardly to a predetermined area of the fastener within said zone, thereby displacing material by the application of pressure which flows outwardly in the zone surrounding the application of pressure, and limiting the outward flow of displaced material to produce thread portions of standard height in the zone surrounding the recess formed by the application of pressure.

3. The method of forming a recess shaped to receive a lock plug of plastic material in a threaded fastener, which comprises supporting the fastener in a die having thread surfaces conforming generally to the threads of the fastener but spaced slightly therefrom in a recessing zone to provide a clearance space for the guided flow of displaced material, the die having a radial opening at the recessing zone which is of uniform cross-section at its inner portion, providing a recessing tool in the opening having its inner end portion extending through the opening and being of uniform cross-section and fitting closely within the opening, pressing the tool radially inwardly to displace material to form the recess, preventing counterflow of material into the radial opening through the die, guiding the displaced material into thread form by the thread surfaces of the die in the recessing zone, and finally withdrawing the tool from the recess formed in the threaded fastener and separating the recessed fastener from the die.

References Cited by the Examiner
UNITED STATES PATENTS

| | | | |
|---|---|---|---|
| 1,161,058 | 11/15 | Lund | 83—2 |
| 1,287,431 | 12/18 | Quarles | 151—24 |
| 2,380,291 | 7/45 | Cameron | 10—14 |
| 2,740,973 | 4/56 | Borner et al. | 10—107 |

ANDREW R. JUHASZ, *Primary Examiner.*

CARL W. TOMLIN, WILLIAM W. DYER, Jr.,
*Examiners.*